United States Patent [19]

Luciani et al.

[11] 4,226,741

[45] Oct. 7, 1980

[54] CATALYSTS FOR POLYMERIZING ALPHA-OLEFINS AND PROCESS FOR POLYMERIZING ALPHA-OLEFINS IN CONTACT WITH SAID CATALYSTS

[75] Inventors: Luciano Luciani, Ferrara, Italy; Norio Kashiwa, Iwakuni, Japan; Pier C. Barbé, Ferrara, Italy; Akinori Toyota, Ohtake, Japan

[73] Assignees: Montedison S.p.A., Milan, Italy; Mitsui Petrochemical Industries, Ltd., Tokyo, Japan

[21] Appl. No.: 934,539

[22] Filed: Aug. 17, 1978

Related U.S. Application Data

[63] Continuation of Ser. No. 832,473, Sep. 12, 1977, abandoned, which is a continuation of Ser. No. 723,431, Sep. 14, 1976, abandoned.

[30] Foreign Application Priority Data

Nov. 21, 1975 [IT] Italy .............................. 29525 A/75

[51] Int. Cl.$^2$ ............................................. C08F 4/64
[52] U.S. Cl. ........................... 252/429 B; 252/429 C; 252/431 R; 252/431 C; 526/125
[58] Field of Search ............ 252/429 B, 429 C, 431 R, 252/431 C

[56] References Cited

U.S. PATENT DOCUMENTS 3,642,746  2/1972  Kashiwa et al. ............. 252/429 C X

FOREIGN PATENT DOCUMENTS 1387890  3/1975  United Kingdom ................. 252/429 B Primary Examiner—Patrick Garvin

[57] ABSTRACT

New highly active and highly stereospecific catalysts for the polymerization of alpha-olefins are disclosed, the starting components of which are (a) an organometallic-compound of Al free from halogen atoms bound directly to the Al atom;

(b) an electron-donor compound (such as a Lewis base) in an amount such that 15% to 100% of the organometallic Al compound (a) is combined with the electron-donor compound; and (c) a solid component comprising, at least on the surface, the reaction product of a halogenated Mg compound with a tetravalent Ti compound and with an electron-donor compound, the molar ratio electron-donor compound/Ti being higher than 0.2, and the molar ratio halogen atoms/Ti being higher than 4.

Processes for polymerizing the alpha-olefins and mixtures thereof with ethylene in contact with the new catalysts are also disclosed.

29 Claims, No Drawings

CATALYSTS FOR POLYMERIZING ALPHA-OLEFINS AND PROCESS FOR POLYMERIZING ALPHA-OLEFINS IN CONTACT WITH SAID CATALYSTS

This is a continuation of application Ser. No. 832,473, filed Sept. 12, 1977 (now abandoned) and which was, in its turn a continuation of application Ser. No. 723,431, filed Sept. 14, 1976 (now abandoned).

THE PRIOR ART

Catalysts which are both highly active and highly stereospecific in the polymerization of alpha-olefins, particularly propylEne, under given conditions, are described in British Pat. No. 1,387,890.

The catalysts described in Br. No. 1,387,890 are generally prepared by starting with a trialkyl Al compound partially complexed with an electron-donor compound and the product obtained by finely grinding a mixture of a Mg dihalide, an electron-donor compound, and a halogenated Ti compound.

The activity of the catalysts of the British patent, in the polymerization of propylene and expressed in terms of gm polymer/gm Ti, is sufficiently high for commercial practice when the polymerization is carried out in a liquid phase but in the absence of inert hydrocarbon diluents.

However, when the polymerization is carried out in an inert hydrocarbon solvent (diluent), the activity of said catalysts decreases to unsatisfactory values, so far as concerns the possibility of obtaining a polymer useful as such and not requiring special purifying after-treatments for the removal of catalyst residues. Moreover, the isotacticity index of the polymers obtained with the aid of the catalysts of the British patent is markedly reduced when the polymerization is carried out in the presence of hydrogen as modifier or regulator of the molecular weight of the polymer produced.

Other catalysts are prepared starting with an alkyl Al compound and the product obtained by reacting a liquid Ti compound with a composition prepared by finely grinding a mixture of a Mg dihalide, an organic ester, and an organic Si compound.

Those last-mentioned catalysts exhibit high stereospecificity in the polymerization of the alpha-olefins and in particular of propylene when the polymerization is carried out in the absence of hydrogen, but the stereospecificity is markedly decreased when hydrogen is used as modifier or regulator of the molecular weight of the polymer produced.

If it is attempted to improve the stereospecificity of the last mentioned catalysts in the presence of hydrogen by adding an electron-donor compound to the alkyl Al compound, an improvement of the isotacticity index of the polymer is obtained but the activity of the catalyst is consideraly reduced.

Polymerization catalysts have been obtained from an alkyl Al compound (triethyl Al) and from a catalyst component prepared by grinding mixtures of $MgCl_2$ with an organic ester and then reacting the ground product with $TiCl_4$.

The last mentioned catalysts exhibit both high activity and high stereospecificity in the polymerization of propylene, provided the polymerization is carried out in the absence of hydrogen as modifier of the molecular weight of the polymer as it is produced. In contrast, when hydrogen is present, the isotacticity index of the polymer is strongly reduced.

THE PRESENT INVENTION

An object of this invention is to provide new catalysts which exhibit both high activity and high stereospecificity in the polymerization of alpha-olefins, in particular of propylene, or of mixtures thereof with ethylene, to crystalline homopolymers or copolymers, even when hydrogen is present during the polymerization reaction as molecular weight modifier or regulator, and even when the polymerization is carried out in an inert hydrocarbon solvent as the polymerization medium or diluent.

The new catalysts which insure the attainment of the aforesaid object—and other objects—of the invention are prepared from the following starting components:

(a) an organometallic Al compound free from halogen atoms bound directly to the Al atom;

(b) an electron-donor compound (or a Lewis Base) used in an amount such that 15% to 100% of the organometallic Al compound (a) is combined with the electron donor compound; and (c) a solid component comprising, at least on the surface, the reaction product of a halogenated Mg compound with a tetravalent Ti compound and with an electron-donor compound, the electron-donor/Ti compound molar ratio being higher than 0.2, the halogen atoms/Ti molar ratio being higher than 4, and said reaction product being further characterized in that at least 80% by weight of the tetravalent Ti compound contained therein is insoluble in boiling n-heptane and at least 50% by weight of the Ti compound which is insoluble in boiling n-heptane is also insoluble in Ti tetrachloride at 80° C., and still further characterized in that the surface area of both the product insoluble in Ti tetrachloride at 80° C., and the surface area of component (c) as such is higher than 20 $m^2/g$, and preferably higher than 40 $m^2/g$.

The new catalysts are preferably prepared by contacting component (c) with the product obtained by premixing components (a) and (b) for a period of time generally shorter than one hour.

High-performance catalysts, as to both activity and stereospecificity can be obtained, also, by mixing together all of components (a), (b) and (c), or by first contacting component (c) with component (a) and then contacting the resulting product with component (b), and vice versa.

In a presently preferred embodiment, the amount of electron-donor compound (b) is such that from 20% to 40% of the organometallic Al compound (a) is combined with the electron-donor compound.

Any electron-donor compound (or Lewis base) capable of forming a complex with the organometallic Al compound (a), or of entering into a substitution reaction with the organometallic Al compound (such as, for example, in the following equation:

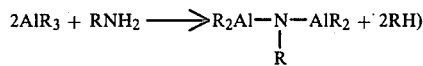

may be used as component (b).

Examples of electron-donor compounds which are useful as component (b) include: amines, amides, ethers, ketones, nitriles, phosphines, stibines, arsines, phosphoramides, thioethers, thioesters, aldehydes, alcoholates, amides and salts of organic acids and of metals belonging to Groups I to IV of the Mendelyeev Periodic Table. If Al salts are used as component (b), they can be formed in situ by reaction of an organic acid with the organometallic Al compound used as component (a).

Examples of specific electron-donor compounds useful as component (b) are: triethylamine, N,N'-dimethyl-piperazine, diethylether, di-n.butylether, tetrahydrofuran, acetone, acetophenone, benzonitrile, tetramethylurea, nitrobenzene, Li-butylate, dimethylaminophenyl-lithium and Na-dimethylamide.

Very good results, as regards both activity and stereospecificity of the catalysts, have been achieved with the esters of the organic and inorganic oxygen-containing acids and with ethers like di-n.butylether. Particularly useful esters are, for example, the alkyl esters of aromatic acids, such as benzoic p-methoxy or ethoxybenzoic and p-toluic acids, such as, for instance, ethyl benzoate, ethyl p-methoxybenzoate, methyl p-toluate and ethyl p-butoxybenzoate.

Additional examples of useful esters are: diethyl carbonate, triethylborate, ethyl pivalate, ethyl naphthoate, ethyl o-chlorobenzoate, ethyl acetate, dimethyl maleate, alkyl or aryl silicates and methylmethacrylate.

The organometallic Al compounds useful as component (a) preferably consist of Al-trialkyl compounds, such as, for example, Al-triethyl, Al-tripropyl, Al-triisobutyl, or the compounds

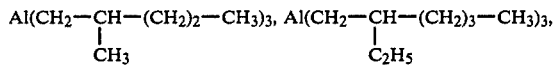

and $Al(C_{12}H_{25})_3$.

Organometallic Al compounds containing two or more Al atoms bound through O or N atoms can also be used as component (a). Said compounds are generally obtained by reacting an Al-trialkyl compound with water, with ammonia, or with a primary amine according to known methods. Examples of such compounds are: $(C_2H_5)_2Al-O-Al(C_2H_5)_2$;

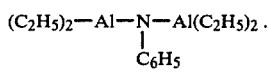

Still other Al compounds suitable for use as component (a) are, for example, the hydrides of aluminum dialkyls, the alkoxides of aluminum-dialkyls such as: $Al(C_2H_5)_2(OC_2H_5)$ and $Al(C_4H_9)_2(OC_4H_9)$, and the sesquialkoxides of Al-alkyls, such as sesquiethoxy-aluminum-ethyl and sesquibutoxy-aluminum-butyl.

The electron-donor compound present in combined form in component (c) may be the same compound used as component (b) or may be a different electron-donor compound. Any electron-donor compound capable of forming complexes with the Mg halides may be used to prepare component (c).

Esters, ethers and diamines are preferably used. Examples of esters are those already specified as useful as component (b) of the catalyst. A particularly efficacious diamine is N,N,N',N'-tetramethylethylenediamine.

Component (c) of the present invention preferably comprises, at least on the surface, reaction products of halogenated Mg compounds selected from Mg dichloride and Mg dibromide, and halogenated compounds of tetravalent Ti, in particular $TiCl_4$, $TiBr_4$ and Ti halogen-alcoholates, and complexes thereof with electron-donor compounds selected from amongst the organic esters, in particular from amongst the esters of the aromatic acids such as, for example, benzoic acid. The nature and composition of component (c) of the present catalysts is further defined by the following parameters:

(1) the Mg/Ti ratio is comprised between 3 and 40, preferably between 10 and 30; the halogen atoms/Ti ratio is comprised between 10 and 90, preferably between 20 and 80, and the ratio moles of electron-donor compound/Ti is higher than 0.2 and in particular is comprised between 0.4 and 3 and more preferably between 1.2 and 3;

(2) at least 80% by weight and preferably 90% by weight, of the Ti compound contained in component (c) is insoluble in boiling n-heptane, while more than 50% by weight, in particular more than 70% by weight, of the Ti compounds insoluble in boiling heptane is insoluble in Ti tetrachloride at 80° C.;

(3) the surface area of component (c) as well as the area of the product insoluble in Ti tetrachloride at 80° C. is generally larger than 100 m²/g and ranges in particular from 100 to 200 m²/g.

Components (c) particularly suitable for preparing very active catalysts according to this invention and having, contemporaneously, a high stereospecificity, are furthermore characterized in that in the X-rays spectrum thereof, the most intense line appearing in the spectrum of Mg dichloride and Mg dibromide of the normal type, as defined by standards ASTM 3-0854 and 15-836 for the chloride and bromide, respectively, exhibits a reduced relative intensity and appears asymmetrically broadened, thus forming a halo showing an intensity peak shifted with respect to interplanar distance d of the maximum intensity line, or the spectrum is characterized in that said maximum intensity line is no longer present and in its place a halo appears having an intensity peak shifted with respect to distance d of said line. When $MgCl_2$ is used in preparing component (c), the halo intensity peak is comprised between d=2.44 Å and 2.97 Å.

Generally, the composition of component (c) may be expressed as consisting for 70-80% by weight of Mg dichloride or Mg dibromide, the difference to 100% consisting of the Ti compound and of the electron-donor compound.

Component (c), however, may include, besides the abovecited components, also inert solid fillers in amounts that can reach 80% and above with respect to the weight of component (c). Examples of such materials are: LiCl, $CaCO_3$, $CaCl_2$, $Na_2SO_4$, $Na_2CO_3$, $Na_2B_4O_7$, $CaSO_4$, $AlCl_3$, $B_2O_3$, $Al_2O_3$, $SiO_2$, $TiO_2$ etc.

We have observed that if component (c) is prepared in the presence of the inert solid matters, the surface area generally decreases. More particularly, we have observed that when component (c) is homogeneously mixed with agglomerating substances, in particular $B_2O_3$, $AlCl_3$, etc., the product obtained has a surface area generally below 10-20 m²/g. However, the performance of the catalysts obtained from such components (c) is still acceptable especially as regards the polymer yield.

In preparing component (c), it is possible to support the active constituents on inert carriers such as, for example, $SiO_2$ and $Al_2O_3$ having a high porosity. In this case, the Ti and Mg halogenated compounds and the electron-donor compound make up a reduced proportion with respect to the total amount, thus permitting to obtain catalysts in which the amount of undesired matters, such as halogens, is minimal.

While the Mg/Ti ratio is generally higher than 1, it is lower than 1 when $TiO_2$ and similar inert Ti compounds, such as the Ti salts of oxygen-containing inorganic acids, are used as inert fillers.

Component (c) may be prepared by various methods.

A general method consists in starting from a particular composition or carrier comprising a Mg halide and a complex between said Mg halide and an electron-donor compound in which the ratio Mg/moles of electron-donor compound is higher than 2 and preferably ranges from 2 to 15, and in treating said composition or carrier with a liquid tetravalent Ti compound under conditions such that a certain amount of Ti compounds is fixed on the carrier, and in subsequently separating the solid reaction product from the liquid phase under conditions such that practically no Ti compounds soluble in boiling n-heptane and extractable with Ti tetrachloride at 80° C. remain on the product.

The peculiar feature of the carrier to be treated with the liquid Ti compound is that of providing an X-rays spectrum in which the diffraction line of maximum intensity appearing in the spectrum of the corresponding Mg halide of normal type exhibits a decreased relative intensity and appears asymmetrically broadened so as to form a halo in which the intensity peak is shifted with respect to the maximum intensity line, or the maximum intensity line is not present in the spectrum and instead of it a halo appears having an intensity peak shifted with respect to distance d of the maximum intensity line.

This carrier, that is the starting product for the preparation of component (c) of the catalysts of this invention, can be obtained in various ways.

A preferred method consists in grinding mixtures of a Mg halide, in particular Mg dichloride or Mg dibromide, with an electron-donor compound, optionally operating in the presence of a Ti compound and/or of an inert co-carrier and/or of agents which facilitate the grinding, such as silicone oils, until the above-described halos having the intensity peak shifted with respect to the maximum intensity line appear in the X-rays spectrum of the ground product.

The ground product is treated with a liquid halogenated Ti compound, in particular $TiCl_4$, at such temperature (generally between room temperature and 200° C.) and for such time-period as to fix the proper amount of Ti compound.

The solid product of the reaction is then separated from the liquid phase, for example by means of filtration, sedimentation, etc., under such conditions of temperature and/or dilution with the liquid Ti compound, that in the solid product, after extraction first with boiling n-heptane and then with $TiCl_4$ at 80° C., amounts of extractable Ti compounds exceeding 20% and 50% by weight respectively are no longer present.

One such method involves reacting, in an inert hydrocarbon solvent, an anhydrous Mg halide with an organic compound containing active hydrogen in the presence of an organic ester and in successively treating the reaction product with an organometallic Al compound.

In another such method, the order of the reactions is inverted, i.e., the complex between the Mg halide and the active hydrogen-containing compound is treated with the organometallic Al compound and the resulting product is then reacted with the organic ester.

The product obtained by said methods is washed with an inert hydrocarbon solvent to remove any traces of free organometallic compound, and is then reacted with a liquid Ti compound, in particular $TiCl_4$ at a temperature ranging from 20° to 200° C.

In accordance with this invention, the solid reaction product is separated from the liquid phase under such filtration or sedimentation conditions that no, or practically no, Ti compounds extractable with boiling n-heptane and with Ti tetrachloride at 80° C. remain on the solid component.

Again, and in accordance with this invention, the reaction product is separated from the liquid phase under such conditions that no, or practically no Ti compounds soluble in boiling heptane and in Ti tetrachloride at 80° C. remain on the solid product.

In the various methods of preparing the carrier, when a Mg halide is used it is preferably as anhydrous as possible ($H_2O$ content lower than 1% by weight), especially when the catalyst component (c) of the present catalysts is prepared by grinding.

It is possible, however, to employ a hydrated Mg halide containing generally from 0.1 to 6 moles of $H_2O$ per mole of halide. Furthermore, it is possible to use oxygen-containing Mg compounds such as MgO, $Mg(OH)_2$, Mg(OH)Cl, Mg carbonate, Mg salts of organic acids, Mg silicate, Mg aluminates, Mg alcoholates and halogenated derivatives thereof. In these cases, the oxygen-containing Mg compound or the hydrated compound is reacted with Ti-tetrachloride in excess, operating preferably at the tetrachloride boiling point and then hot-separating the solid product, preferably at the $TiCl_4$ boiling point.

The resulting solid product is treated in suspension in an inert hydrocarbon with an organic ester, in particular with an ester of an aromatic carboxylic acid in amounts equal to 1–20 moles per g-atom of Ti contained in the carrier, operating at temperatures ranging from room temperature to 200° C.

The solid product so treated is accurately separated from the unreacted ester, and then reacted with a liquid halogenated Ti compound and separated from the reaction liquid phase under the conditions specified for the other methods of preparing the carrier described herein.

In all these preparation methods it is of essential importance that at least 80% by weight of the Ti compounds contained in component (c) is insoluble in boiling n-heptane, and that less than 50% of the Ti compounds insoluble in boiling heptane is extractable with Ti tetrachloride at 80° C. In fact, the presence of soluble Ti compounds is detrimental to both the activity and the stereospecificity of the catalyst, particularly when the polymerization is conducted in the presence of hydrogen.

The new catalysts according to the present invention are preferably employed in the polymerization of alpha-olefins having at least three carbon atoms and in particular in the preparation of crystalline polymers and copolymers of propylene. They can be used, also, in the polymerization of ethylene, in which case component (b) may be omitted.

The polymerization is conducted according to conventional methods, operating in a liquid phase, either in the presence or in the absence of an inert hydrocarbon diluent, such as hexane, heptane, cyclohexane, etc., or in a gas phase.

The polymerization is generally carried out at a temperature comprised between 0° and 150° C., preferably between 40° and 90° C., and at atmospheric pressure or at a higher pressure.

When crystalline copolymers of propylene are desired, it is preferable to polymerize propylene alone until a homopolymer equal to 60–90% of the total polymerizate is obtained, and to follow the propylene homopolymerization step with one or more polymerization steps in which mixtures of propylene and ethylene are polymerized or in which ethylene alone is polymerized, to obtain polymerizates containing from 5% to 30% by weight of polymerized ethylene, calculated on the weight of the total polymerizate. Mixtures of propylene and ethylene can be polymerized to obtain a copolymer containing, at most, 5% by weight of polymerized ethylene.

The following examples are given to illustrate the invention in more detail, and are not intended to be limiting.

EXAMPLES 1 to 11 AND COMPARATIVE EXAMPLES 1-2

(A) Grinding

Anhydrous $MgCl_2$ (containing less than 1% by weight of water), ethyl benzoate (EB) and, optionally, a silicone were co-ground in two vibrating mills of the type VIBRATOM manufactured by N. V. TEMA'S, Gravenhage (Holland), having a total volume of one and six liters, respectively, and containing, respectively 3 and 18 kg of stainless steel balls of 16 mm diameter.

Grinding was effected employing a filling coefficient equal to 135 g/l of total volume (vacuum), at an interior temperature of the mill around 40° C. and with grinding times, different from run to run, varying from 50 to 100 hours.

Charging of the mill with the materials to be ground, the grinding, and discharging of the product of the cogrinding from the mill occurred in a nitrogen atmosphere.

In Example 10, the grinding was conducted in a rotary mill having a capacity of 1 liter, containing 120 stainless steel balls of 15.8 mm diameter and rotated at 50 r.p.m.

Table 1 shows, for the various runs, the data relating to type and amount of the materials co-ground, the grinding conditions and the characteristics of the products obtained.

(B) Treatment with $TiCl_4$

A portion (15–50 g) of the co-ground product was transferred, always in a nitrogen atmosphere, into a 500 cc reactor, wherein it was contacted with an excess of $TiCl_4$. The treatment with $TiCl_4$ took place at temperatures ranging from 80° to 135° C. for a 2-hour period, whereupon the $TiCl_4$ in excess and the products soluble therein were removed by filtration at the temperatures specified in Table 1. Two or more washings with boiling hexane followed.

The resulting solid product was dried in a nitrogen atmosphere and a portion thereof was analyzed to determine the percent content of Ti and Cl.

The data relating to the operating conditions employed in the various runs during the treatment with $TiCl_4$ as well as the characteristics of the solid products thus obtained are reported in Table 1.

The stereospecificity and activity of these solid products (catalyst components) were determined in runs on the polymerization of propylene in a hydrocarbon solvent or in liquid monomer using, as co-catalysts, aluminum-trialkyls treated with electron-donor compounds.

(C) Polymerization in a Solvent

A 2500 cc autoclave, equipped with a stirrer and previously purified with nitrogen at 60° C. was used. Polymerization was conducted at 60° C., at a propylene ($C_3^-$) pressure of 5, 8 or 9 eff. atmosph. (kept constant by addition of propylene during the polymerization runs) for a 4 or 5 hour time-period.

As hydrocarbon solvent use was made of technical dearomatized and anhydrified (1000 cc) n-heptane ($nC_7^+$), hexane ($C_6^+$) or heptane ($C_7^+$). $Al(C_2H_5)_3$ [TEA] or $Al(iC_4H_9)_3$ [TIBAL] was used as the Al trialkyl [component (a)], p-ethylanisate [PEA] or ethyl p-toluate [EPT] was used as electron-donor compound. The Al trialkyl and electron-donor molar ratio was comprised between 2.74 and 3.14. Hydrogen was present as molecular weight modifier.

The autoclave was charged, in the order stated and in a propylene atmosphere, with the solvent (870 cc), a portion of Al-alkyl and of donor previously mixed for 10' in 150 cc of the solvent, and contemporaneously with the supported catalyst component in suspension in 80 cc of solvent containing the remaining portion of Al-alkyl and of donor. Hydrogen and propylene were then introduced into the autoclave until the polymerization pressure was reached, and the temperature was raised to the value required.

At the conclusion of the polymerization run the solvent was removed by stripping with steam and the polymer so obtained was dried in a nitrogen atmosphere at 70° C.

(D) Polymerization In Liquid Monomer

Autoclaves of 30 liters and 135 liters capacity and equipped with a stirrer were used. The polymerization temperature was 65° C., with propylene at 26.5 eff. atmosph., for a time of 5 hours. Hydrogen (15 Nl and 50 Nl) was present as molecular weight modifier.

$Al(C_2H_5)_3$ in an amount of 12.5 g (runs in the 30-l. autoclave) and $Al(iC_4H_9)_3$ in an amount of 36 g (runs in the 135 l autoclave), both treated with electron-donor compounds (p-methylanisate or ethyl p-toluate in molar ratios of from 2.2 to 2.74) were employed as aluminum trialkyls.

The autoclave was charged in the order stated and in a propylene atmosphere, with the Al trialkyl in a 12% by weight heptane solution, with liquid propylene and with the donor.

The autoclave was heated to the polymerization temperature and the catalyst component (c) and the hydrogen were then introduced.

At the conclusion of the polymerization, the residual propylene was evaporated and the polymer was then dried in a nitrogen atmosphere at 70° C.

In both runs (polymerization in a solvent and in liquid monomer), the dry polymer was weighed to calculate the yield with respect to titanium present in the catalyst; moreover, the polymer was extracted with boiling n-heptane to determine the amount, in percent, of polymer insoluble in boiling n-heptane.

Apparent density and inherent viscosity (in tetralin at 135° C.) of the polymer thus obtained were determined. Table 2 reports the data relating to the various polymerization runs and to the characteristics of the polymers obtained.

TABLE 1

PREPARATION OF THE SUPPORTED CATALYST COMPONENT

| | Measure Units | \_\_\_\_ EXAMPLES \_\_\_\_ | | |
|---|---|---|---|---|
| | | 1 | 2 | 3 |
| GRINDING | | | | |
| Vibrating mill volume | l | | 6 | 6 | 6 |
| Rotary mill volume | l | | | | |
| $MgCl_2$ | g | 530 | 651.5 | 651.5 |
| EB amount | g | 280 | 158.5 | 158.5 |
| $MgCl_2$/EB molar ratio | | 3/1 | 6.5/1 | 6.5/1 |
| Silicone oil and amount of $TiCl_4$ | g | | | |
| $B_2O_3$ | g | | | |
| Grinding time | h | 100 | 50 | 50 |
| CHARACTERISTICS OF THE GROUND PRODUCT | | | | |
| X-ray spectrum* | | | A | A |
| TREATMENT WITH $TiCl_4$ | | | | |
| $TiCl_4$ | g | 375 | 375 | 375 |
| Ground product | g | 25 | 25 | 25 |
| Ground product of comp. Ex. 1 | g | | | |
| Treatment temperature | °C. | 80 | 80 | 135 |
| Filtration temperature | °C. | 80 | 80 | 135 |
| Washing with boiling heptane (amount) | g | | | |
| CHARACTERISTICS OF THE PRODUCT TREATED WITH $TiCl_4$ | | | | |
| Elemental analysis: | | | | |
| Ti | % by weight | 1.30 | 1.60 | 1.80 |
| Cl | % by weight | 63.15 | 65.25 | 68.60 |
| Surface area | $m^2$/g | | 150 | 190 |

| | Measure Units | \_\_\_\_ EXAMPLES \_\_\_\_ | | |
|---|---|---|---|---|
| | | 4 | 5 | Cfr. 1 |
| GRINDING | | | | |
| Vibrating mill volume | l | 6 | 6 | 6 |
| Rotary mill volume | l | | | |
| $MgCl_2$ | g | 651.5 | 651.5 | 651.5 |
| EB amount | g | 158.5 | 158.5 | 158.5 |
| $MgCl_2$/EB molar ratio | | 6.5/1 | 6.5/1 | 6.5/1 |
| Silicone oil and amount of $TiCl_4$ | g | | | 200 |
| $B_2O_3$ | g | | | |
| Grinding time | h | 100 | 100 | 100 |
| CHARACTERISTICS OF THE GROUND PRODUCT | | | | |
| X-ray spectrum* | | B | B | B |
| TREATMENT WITH $TiCl_4$ | | | | |
| $TiCl_4$ | g | 375 | 375 | |
| Ground product | g | 25 | 25 | |
| Ground product of comp. Ex. 1 | g | | | |
| Treatment temperature | °C. | 80 | 130 | |
| Filtration temperature | °C. | 80 | 135 | |
| Washing with boiling heptane (amount) | g | | | |
| CHARACTERISTICS OF THE PRODUCT TREATED WITH $TiCl_4$ | | | | |
| Elemental analysis: | | | | |
| Ti | % by weight | 1.95 | 2.15 | 5.1 |
| Cl | % by weight | 67.30 | 67.7 | 61.6 |
| Surface area | $m^2$/g | 176 | 185 | 3 |

TABLE 1-continued

| | Measure Units | \_\_\_ EXAMPLES \_\_\_ | | |
|---|---|---|---|---|
| | | 6 | Cfr. 2 | 7 |
| GRINDING | | | | |
| Vibrating mill volume | l | 1 | | 1 |
| Rotary mill volume | l | 1 | | |
| $MgCl_2$ | g | | | 96.5 |
| EB amount | g | | | 30.6 |
| $MgCl_2$/EB molar ratio | | | | 5/1 |
| Silicone oil and amount of $TiCl_4$ | g | | | **PDMS 500/13.5 |
| $B_2O_3$ | g | | | |
| Grinding time | h | | | 100 |
| CHARACTERISTICS OF THE GROUND PRODUCT | | | | |
| X-ray spectrum* | | | | |
| TREATMENT WITH $TiCl_4$ | | | | |
| $TiCl_4$ | g | 375 | | 150 |
| Ground product | g | | | 18 |
| Ground product of comp. Ex. 1 | g | 25 | 25 | |
| Treatment temperature | °C. | 80 | | 80 |
| Filtration temperature | °C. | 80 | | 80 |
| Washing with boiling heptane (amount) | g | | 800 | |
| CHARACTERISTICS OF THE PRODUCT TREATED WITH $TiCl_4$ | | | | |
| Elemental analysis: | | | | |
| Ti | % by weight | 2.6 | 1.65 | 1.55 |
| Cl | % by weight | | 58.4 | |
| Surface area | $m^2$/g | | 4 | |

| | Measure Units | \_\_\_ EXAMPLES \_\_\_ | | |
|---|---|---|---|---|
| | | 8 | 9 | 10 |
| GRINDING | | | | |
| Vibrating mill volume | l | 1 | 1 | 6 |
| Rotary mill volume | l | 1 | | 1 |
| $MgCl_2$ | g | 96.5 | 651.5 | 20 |
| EB amount | g | 30.6 | 157 | 6 |
| $MgCl_2$/EB molar ratio | | 5/1 | 6.5/1 | 5.2/1 |
| Silicone oil and amount of $TiCl_4$ | g | **PDMS 100/13.9 | | **PDMS 50/3 |
| $B_2O_3$ | g | | | |
| Grinding time | | 100 | 100 | 100 |
| CHARACTERISTICS OF THE GROUND PRODUCT | | | | |
| X-ray spectrum* | | | | |
| TREATMENT WITH $TiCl_4$ | | | | |
| $TiCl_4$ | g | 375 | 375 | 150 |
| Ground product | g | 25 | 25 | 28 |
| Ground product of Comp. Ex. 1 | g | | | |
| Treatment temperature | °C. | 80 | 80 | 80 |
| Filtration temperature | °C. | 80 | 80 | 80 |
| Washing with boiling heptane (amount) | g | | | |
| CHARACTERISTICS OF THE PRODUCT TREATED WITH $TiCl_4$ | | | | |
| Elemental analysis: | | | | |
| Ti | % by weight | 1.65 | 2.00 | 1.1 |
| Cl | % by weight | 62.05 | 62.55 | 66.1 |
| Surface area | $m^2$/g | 172 | | |

| | Measure Units | EXAMPLES | | |
|---|---|---|---|---|
| | | 11 | — | — |

TABLE 1-continued

| GRINDING | | |
|---|---|---|
| Vibrating mill volume | l | 1 |
| Rotary mill volume | l | 1 |
| MgCl$_2$ | g | 45 |
| EB amount | g | 10.1 |
| MgCl$_2$/EB molar ratio | | 6.8/1 |
| Silicone oil and amount of TiCl$_4$ | g | |
| B$_2$O$_3$ | g | 54 |
| Grinding time | h | |
| CHARACTERISTICS OF THE GROUND PRODUCT | | |
| X-ray spectrum* | | |
| TREATMENT WITH TiCl$_4$ | | |
| TiCl$_4$ | g | 135 |
| Ground product | g | 20 |
| Ground product of comp. Ex. 1 | g | |
| Treatment temperature | °C. | 80 |
| Filtration temperature | °C. | 80 |
| Washing with boiling heptane (amount) | g | |
| CHARACTERISTICS OF THE PRODUCT TREATED WITH TiCl$_4$ | | |
| Elemental analysis: | | |
| Ti | % by weight | 1.4 |
| Cl | % by weight | 3.1 |
| Surface area | m$^2$/g | 80 |

*Spectrum A is the spectrum in which the maximum intensity line of magnesium chloride that appears at d = 2.56 A has decreased in relative intensity and broadened asymmetrically forming a halo, the intensity peak of which is comprised between d = 2.44 A and d = 2.97 A. Spectrum B is a spectrum in which the aforesaid maximum intensity line is absent and replaced by a halo having an intensity peak shifted with respect to such line, and comprised between d = 2.44 A and d = 2.97 A.
**PDSM 500, PDSM 100 and PDSM 50 are polydimethylsiloxanes having a viscosity of 500, 100 and 50 centistokes, respectively.

TABLE 2
RESULTS OF THE PROPYLENE POLYMERIZATION

| | Measure Units | REFERENCE EXAMPLE IN TABLE 1 | | |
|---|---|---|---|---|
| | | 1 | 1 | 2 |
| CATALYST COMPONENT | | | | |
| Catalyst component amount | mg | 80 | 450 | 70 |
| Ti | % by weight | 1.30 | | 1.60 |
| Cl | % by weight | 63.15 | | 65.25 |
| POLYMERIZATION RUNS | | | | |
| Autoclave capacity | l | 2.5 | 30 | 2.5 |
| Polymerization medium and volume | cc | nC$_7^+$/ 1000 | C$_3^-$/ 23,000 | nC$_7^+$/ 1000 |
| C$_3^-$ effective pressure | atm | 5 | 26.5 | 5 |
| Polymerization temperature | 20° C. | 60 | 65 | 60 |
| Polymerization time | h | 4 | 5 | 4 |
| Type of Al-alkyl | | TEA | TEA | TEA |
| Amount of Al-alkyl | g | 1.135 | 12.5 | 1.135 |
| Type of donor | | PEA | PEA | PEA |
| Al alkyl/donor molar ratio | | 3.14 | 2.74 | 3.14 |
| Hydrogen amount | Ncc | 110 | 15000 | 110 |
| RESULTS OF POLYMERIZATION RUNS | | | | |
| Yield | g polymer/ g Ti | 113,500 | 274,000 | 103,000 |
| Isotacticity index | % | 94.0 | 94.5 | 93.5 |

TABLE 2-continued
RESULTS OF THE PROPYLENE POLYMERIZATION

| CHARACTERISTICS OF THE POLYMER OBTAINED | | | | |
|---|---|---|---|---|
| Polymer apparent density | kg/l | 0.47 | 0.45 | 0.44 |
| Polymer intrinsic viscosity | dl/g | 1.6 | 2.3 | 1.8 |

| | Measure Units | REFERENCE EXAMPLE IN TABLE 1 | | |
|---|---|---|---|---|
| | | 3 | 4 | 4 |
| CATALYST COMPONENT | | | | |
| Catalyst component amount | mg | 127 | 66 | 310 |
| Ti | % by weight | 1.80 | 1.95 | |
| Cl | % by weight | 68.0 | 67.30 | |
| POLYMERIZATION RUNS | | | | |
| Autoclave capacity | l | 2.5 | 2.5 | 30 |
| Polymerization medium and volume | cc | nC$_7^+$/ 1000 | nC$_7^+$/ 1000 | C$_3^-$/ 23,000 |
| C$_3^-$ effective pressure | atm | 5 | 5 | 26.5 |
| Polymerization temperature | °C. | 60 | 60 | 65 |
| Polymerization time | h | 4 | 4 | 5 |
| Type of Al-alkyl | | TEA | TEA | TEA |
| Amount of Al-alkyl | g | 1.135 | 1.135 | 12.5 |
| Type of donor | | PEA | PEA | PEA |
| Al alkyl/donor molar ratio | | 3.14 | 3.14 | 2.74 |
| Hydrogen amount | Ncc | 110 | 110 | 15,000 |
| RESULTS OF POLYMERIZATION RUNS | | | | |
| Yield | g polymer/ g Ti | 107,000 | 155,000 | 324,000 |
| Isotacticity index | % | 91.5 | 93.0 | 93.5 |
| CHARACTERISTICS OF THE POLYMER OBTAINED | | | | |
| Polymer apparent density | kg/l | 0.48 | 0.48 | 0.50 |
| Polymer intrinsic viscosity | dl/g | 2.0 | 1.8 | 2.1 |

| | Measure Units | REFERENCE EXAMPLE IN TABLE 1 | | |
|---|---|---|---|---|
| | | 5 | 6 | 7 |
| CATALYST COMPONENT | | | | |
| Catalyst component amount | mg | 82 | 72 | 110 |
| Ti | % by weight | 2.15 | 2.15 | 1.55 |
| Cl | % by weight | 67.7 | | |
| POLYMERIZATION RUNS | | | | |
| Autoclave capacity | l | 2.5 | 2.5 | 2.5 |
| Polymerization medium and volume | cc | nC$_7^+$/ 1000 | nC$_7^+$/ 1000 | nC$_7^+$/ 1000 |
| C$_3^-$ effective pressure | atm | 5 | 5 | 5 |
| Polymerization temperature | °C. | 60 | 60 | 60 |
| Polymerization time | h | 4 | 4 | 4 |
| Type of Al-alkyl | | TEA | TEA | TEA |
| Amount of Al-alkyl | g | 1.135 | 1.135 | 1.135 |
| Type of donor | | PEA | PEA | PEA |
| Al alkyl/donor molar ratio | | 3.14 | 3.14 | 3.14 |
| Hydrogen amount | Ncc | 110 | 110 | 110 |
| RESULTS OF POLYMERIZATION RUNS | | | | |
| Yield | g polymer/ g Ti | 174,000 | 164,500 | 123,000 |
| Isotacticity Index | % | 90.5 | 91.5 | 94. |
| CHARACTERISTICS OF | | | | |

TABLE 2-continued
RESULTS OF THE PROPYLENE POLYMERIZATION

| THE POLYMER OBTAINED | | | | |
|---|---|---|---|---|
| Polymer apparent density | kg/l | 0.43 | 0.48 | 0.49 |
| Polymer intrinsic viscosity | dl/g | 2.0 | 1.8 | |

| | Measure Units | REFERENCE EXAMPLE IN TABLE 1 | | |
|---|---|---|---|---|
| | | 8 | 9 | 10 |
| CATALYST COMPONENT | | | | |
| Catalyst component amount | mg | 63 | 65 | 110 |
| Ti | % by weight | 1.65 | 2.00 | 1.1 |
| Cl | % by weight | 62.05 | 65.00 | 66.1 |
| POLYMERIZATION RUNS | | | | |
| Autoclave capacity | l | 2.5 | 2.5 | 2.5 |
| Polymerization medium and volume | cc | $C_6^+$/ 1000 | $C_6^+$/ 1000 | $C_7^+$/ 1000 |
| $C_3^-$ effective pressure | atm | 9 | 9 | 5 |
| Polymerization temperature | °C. | 60 | 60 | 60 |
| Polymerization time | h | 4 | 4 | 4 |
| Type of Al-alkyl | | TIBAL | TIBAL | TEA |
| Amount of Al-alkyl | g | 1.97 | 1.97 | 1.135 |
| Type of donor | | EPT | EPT | PEA |
| Al alkyl/donor molar ratio | | 3.14 | 3.14 | 3.14 |
| Hydrogen amount | Ncc | 190 | 190 | 110 |
| RESULTS OF POLYMERIZATION RUNS | | | | |
| Yield | g polymer/g Ti | 353,000 | 344,000 | 141,000 |
| Isotacticity Index | % | 92.0 | 92.5 | 92 |
| CHARACTERISTICS OF THE POLYMER OBTAINED | | | | |
| Polymer apparent density | kg/l | 0.50 | 0.43 | 0.48 |
| Polymer intrinsic viscosity | dl/g | 2.4 | 3.0 | 1.7 |

| | Measure Units | REFERENCE EXAMPLE IN TABLE 1 | | |
|---|---|---|---|---|
| | | 11 | cfr.1 | cfr.2 |
| CATALYST COMPONENT | | | | |
| Catalyst component amount | mg | 100 | 105 | 105 |
| Ti | % by weight | 1.3 | 5.7 | 1.65 |
| Cl | % by weight | 31 | 61.0 | 58.4 |
| POLYMERIZATION RUNS | | | | |
| Autoclave capacity | l | 2.5 | 2.5 | 2.5 |
| Polymerization medium and volume | cc | $C_6^+$/ 1000 | $C_7^+$/ 1000 | $C_6^+$/ 1000 |
| $C_3^-$ effective pressure | atm | 9 | 8 | 9 |
| Polymerization temperature | °C. | 60 | 60 | 60 |
| Polymerization time | h | 4 | 5 | 4 |
| Type of Al-alkyl | | TIBA | TEA | TIBA |
| Amount of Al-alkyl | g | 1.97 | 1.00 | 1.135 |
| Type of donor | | EPT | PEA | EPT |
| Al alkyl/donor molar ratio | | 3.14 | 2.9 | 3.14 |
| Hydrogen amount | Ncc | 190 | 1.70 | 190 |
| RESULS OF POLYMERIZATION RUNS | | | | |
| Yield | g polymer/g Ti | 290,000 | 70,000 | 89,500 |
| Isotacticity index | % | 90 | 90.5 | 88.5 |
| CHARACTERISTICS OF THE POLYMERS | | | | |

TABLE 2-continued
RESULTS OF THE PROPYLENE POLYMERIZATION

| OBTAINED | | | | |
|---|---|---|---|---|
| Polymer apparent density | kg/l | 0.4 | 0.43 | 0.28 |
| Polymer intrinsic viscosity | dl/g | | 1.9 | |

EXAMPLE 12

Anhydrous MgCl₂ (containing less than 1% by weight of H₂O) was co-ground with the electron-donor compounds listed in Table 3, under the conditions used in Example 4. The ground product was treated with TiCl₄ under the conditions of Example 4. The reaction product thus obtained had the Cl and Ti contents indicated in Table 3.

The catalyst components thus obtained were used to obtain final catalysts which were then used in polymerization runs under the conditions set forth in Example 8 with the only difference that the effective $C_3$ pressure was 5.4 atm. The data concerning the yield of polymer and isotacticity index are reported in Table 3.

TABLE 3

| Electron-donor | EPT | PEA | MB | MMA | NBE |
|---|---|---|---|---|---|
| Ti % by weight | 1.3 | 1.75 | 1.8 | 2.0 | 2.1 |
| Cl % by weight | 59.8 | 60.9 | 61 | 62 | 63.9 |
| Yield (g polymer/g Ti) | 250,000 | 183,000 | 170,000 | 167,000 | 185,000 |
| Isotacticity index | 92 | 93 | 94 | 94.5 | 92 |

EPT = ethyl p-toluate
PEA = p.ethylanisate
MB = methylbenzoate
MMA = methylmethacrylate
NBE = di (n.butyl)-ether

EXAMPLE 13

500 ml of kerosene were introduced into a flask provided with a stirrer. Propylene was introduced at a rate of 30 l/hr for 1 hour to expel air and moisture.

2.5 m mol of Al-triethyl and 0.884 mmol of the electron-donor compound indicated in Table 4 were introduced into the flask at room temperature. Five minutes later a catalyst component prepared according to Example 7, with the only difference that a silicone oil having a viscosity of 20 centistokes at 20° C. was introduced. The molar ratio Al/Ti in the catalyst was 25.

The mixture was heated at 60° C. Propylene was polymerized for 1 hour at atmospheric pressure and was introduced at a rate to maintain the pressure constant during the polymerization. Thereafter, propylene was replaced by nitrogen and the reaction mixture was cooled to room temperature. The solid product was filtered off, washed twice with methanol, then dried at 70° C. The soluble polymer was recovered by evaporation of the kerosene layer in the filtrate. The data concerning the yield and the total isotacticity index of the polymer are reported in Table 4.

TABLE 4

| Electron-donor | BA | POBA | AAC | BAA | NBE |
|---|---|---|---|---|---|
| Yield (g. polymer/g Ti) | 47,900 | 43,140 | 40,430 | 41,900 | 31,500 |
| Isotacticity index (on the total) | 75.6 | 89.2 | 80.3 | 73.9 | 92.1 |

BA = benzoic acid
POBA = p.oxybenzoic acid
AAC = alpha-aminoacetic acid
BAA = benzoic acid amide
NBE = di (n.butyl)-ether

EXAMPLE 14

10 g of a catalyst component prepared according to Example 13 and containing 2.1% by weight of Ti were suspended in 150 ml of kerosene. Diethylaluminum chloride (2.2 m. mol diluted with kerosene) was added at room temperature and then 2.2 mmol of ethylbenzoate were added and the mixture was stirred for 1 hour. The solid product was filtered, washed with hexane, and dried in vacuum.

Into an autoclave of 2 l capacity and containing 750 ml of n.-hexane and 3.75 mmol of $Al(C_2H_5)_3$ premixed with 1.25 mmol of methyl p-toluate, there was introduced an amount of the dried product corresponding to 0.03 mmol/l of Ti.

The polymerization run was carried out for 4 hours at 60° C. at a propylene pressure of 8 atm and in the presence of 400 N liter of hydrogen.

After removal of the solid by filtration and drying, 225.9 g of powder were obtained, the isotactic index of which was 94.2. From the filtrate 5.9 g of polymer soluble in n-hexane were recovered.

EXAMPLE 15

10 g of $MgCl_2$ containing less than 1% by weight of water and suspended in kerosene (100 ml) were treated with 18.4 ml of ethyl alcohol at 20° C. for 2 hours. The complex of $MgCl_2$ with ethanol was reacted with 2.5 ml of 2,6-dimethylphenol at 20° C. for 1 hour, 11.7 ml of ethylbenzoate at 80° C. for 1 hour and 22.9 ml of $Al(C_2H_5)_2Cl$ at 20° C. for 2 hours, in the order stated.

The solid product was separated by filtration, washed with n. hexane and dried in vacuum. 10 g of the product were treated with 100 ml of $TiCl_4$ at 100° C. for 2 hours. The excess of $TiCl_4$ was separated by filtration. The solid product was washed repeatedly with n-hexane and then dried in vacuum.

The elemental analysis of the product gave the following results:

Ti = 3.60% by weight
Cl = 58.0% by weight 31 mg of the solid product were used in a polymerization run under the conditions of Example 14. After removal of the solvent by filtration and drying, 130 g of polymer were obtained. The isotactic index of this polymer was 95.4. The polymer soluble in hexane and recovered from the filtrate amounted to 30 g.

EXAMPLE 16

Catalyst Preparation

One (1) kg of anhydrous $MgCl_2$, 0.23 l of ethyl benzoate and 0.15 l of PDMS* 50 were place in a 100 l vibrating mill (containing therein 350 kg of stainless steel balls, each 15 mm in diameter), in which they were brought into mutual contact for 120 hr at 70° C.
* Polydimethyl siloxane viscosity 50 centistokes Of the product of copulverization so obtained, 500 g was suspended in 5 l of $TiCl_4$, and the resulting suspension was allowed to undergo reaction at 80° C. for 2 hr. After completion of the reaction, the resulting system was filtrated at the same temperature for recovery of its solid component, which was then washed thoroughly with hexane until free $TiCl_4$ was no longer detected.

The resulting solid component contained 2.0, 23.0 and 64.0 wt% of Ti, Mg and Cl as atoms and 10.5 wt% of ethyl benzoate respectively, and exhibited a specific surface area of 200 $m^2/g$.

Polymerization

An equipment was used comprising 4 reactors lines up in series, namely, reactors A, B, D and E (each with an effective volume of 190, 120, 140 and 200 l respectively) and a flash drum C (with an effective volume of 30 l) installed between the reactors B and D.

The reactor A was charged with 0.75 mmol-Ti/hr as hexane slurry of the solid CAT component prepared as described above, and a hexane solution of triethyl-Al and ethyl p-toluate (EPT) in such amounts that the Al/Ti and Al/EPT mol ratios will be 50 and 2.75 respectively, all together at a rate of 21 l/hr as the total hexane quantity.

Furthermore, the reactor was charged with 7 $Nm^3/hr$ of propylene and 13 Nl/hr of hydrogen, while maintaining the reactor pressure at 7 $kg/cm^2$ Gauge and the polymerization temperature at 60° C. As the result, PP having its isotacticity index and MI* at 92.8% and 0.36 respectively was produced in the reactor A at a rate of 240,000 g-PP/g-Ti.
** Propylene
*** Melt index The polymer slurry discharged from the reactor A was then forwarded to the reactor B, to which 4.5 mmol/hr of triethyl-Al and 5 Nl/hr of hexane were charged anew. Polymerization in the reactor B was then performed at a 3.0 $kg/cm^2G$ pressure and 60° C. as the polymerization temperature.

PP having its isotacticity index at 92.2% and MI at 0.32 was produced in the reactors A and B collectively at a rate of 290,000 g-PP/g-Ti.

The polymer slurry discharged from the reactor B was then directed to the flash drum C, where unreacted propylene monomer was removed, and thereafter forwarded to the reactor D, to which 1,000 Nl/hr of ethylene and 80 Nl/hr of hydrogen were supplied additionally, together with nitrogen gas to maintain the reactor pressure at 2.5 $kg/cm^2G$.

The composition of the gas held in the reactor D was: hydrogen 7.3%, nitrogen 45.5%, ethylene 25.8%, propylene 0.9% and hexane 20.4%.

As the result of polymerization in the reactor D at 60° C. as the polymerization temperature, a polymer having its MI at 0.29 and bulk density at 0.350 was obtained at a rate of 27,000 g-polymer/g-Ti.

The polymer slurry discharged from the reactor D was then forwarded to the reactor E, to which ethylene was supplied at a rate of 1,700 Nl/hr, hydrogen at a rate of 70 Nl/hr, triethyl-Al 4.5 mmol/hr and hexane 10 l/hr additionally.

Polymerization was carried out under the polymerization pressure of 2.0 $kg/cm^2G$ and the polymerization temperature of 60° C., while the composition of the gas held in the reactor E was: hydrogen 38.2%, nitrogen 3.4%, ethylene 35.6%, propylene 0.1% and hexane 22.6%.

As the result of polymerization in reactor E, a polymer having its MI at 0.24 and bulk density at 0.350 was produced at a rate of 24,000 g-polymer/g-Ti. The polymer so produced contained 17.6 parts by weight of ethylene polymer per 100 parts by weight of PP.

In a further embodiment of the invention, the valence of tetravalent Ti contained in component (c) is reduced to a value lower than 4, by treatment with reducing agents before component (c) is contacted with component (a).

We claim:

1. Catalysts for the polymerization of alpha-olefins containing at least 3 carbon atoms and mixtures thereof with ethylene, comprising the product obtained by contacting the following starting components:
   (a) a hydrocarbyl Al compound not containing halogen atoms directly bound to Al;
   (b) a hydrocarbyl electron-donor capable of forming complexes or substitution reaction products with the Al compound (a) in such amount that 15% to 100% of the Al compound is combined with the electron-donor compound; and
   (c) a solid component comprising, at least on the surface, the reaction product of a Mg dihalide with a halogenated teatrvalent Ti compound selected from the group consisting of Ti tetrahalides and Ti halogen alcoholates and with a hydrocarbyl electron-donor capable of forming complexes with Mg dihalides, the molar ratio electron-donor/Ti in said product being higher than 0.2 and the molar ratio halogen atoms/Ti being comprised between 10 and 90, component (c) being further characterized in that at least 80% by weight of the tetravalent Ti compounds contained therein is insoluble in boiling n-heptane and in that at least 50% by weight of the Ti compounds insoluble in n-heptane is insoluble in $TiCl_4$ at 80° C., and also in that the surface area of the product insoluble in $TiCl_4$ at 80° C., and the surface area of component (c) as such, is higher than 40 $m^2/g$.

2. The catalysts of claim 1 in which component (c) is further characterized in that the X-rays spectrum thereof shows a halo the maximum intensity of which is shifted with respect to the distance d of the maximum intensity line which appears in the X-rays spectrum of the corresponding normal Mg dihalide.

3. Catalysts according to claim 1, in which the electron-donor compound is an ester of an organic carboxylic acid.

4. Catalysts according to claim 1, in which the electron-donor compound is an ester of an aromatic carboxylic acid.

5. Catalysts according to claim 1, in which the amount of electron-donor compound (b) is from 0.2 to 0.4 moles per mole of the organometallic Al compound, component (a).

6. Catalysts according to claim 1, in which, in component (c), the Mg/Ti molar ratio is comprised between 10 and 30; the halogen/Ti atomic ratio is comprised between 20 and 80; and the electron-donor compound/Ti molar ratio is comprised between 1.2 and 3.

7. Catalysts according to claim 1, in which component (c) is characterized in that the surface area of the product insoluble in Ti tetrachloride at 80° C., and the surface area of component (c) as such, is greater than 100 $m^2/g$.

8. Catalysts according to claim 7, in which component (c) is characterized in that the surface area of the product insoluble in Ti tetrachloride at 80° C., and surface area of component (c) as such, is comprised between 100 and 200 $m^2/g$.

9. Catalysts according to claim 1, in which component (c) contains inert solid fillers other than Ti oxides and Ti salts of oxygen-containing inorganic acids, in amounts up to 80% by weight based on the total weight of the component.

10. Catalysts according to claim 1, in which component (c) is deposited on $SiO_2$ or $Al_2O_3$ having a porosity higher than 0.3 cc/g.

11. Catalysts according to claim 1, in which component (c) contains inert fillers selected from the group consisting of $TiO_2$ and Ti salts of inorganic oxygen-containing acids, and in which the Mg/Ti ratio is lower than 1.

12. Catalyst according to claim 1 in which component (c) is mixed with an agglomerating substance selected from the group consisting of $B_2O_3$ and $AlCl_3$.

13. Catalysts according to claim 12, in which the surface area of the mixed product is smaller than 40 $m^2/g$.

14. Catalysts according to claim 1, in which component (c) is prepared by reacting a liquid halogenated tetravalent Ti compound with a solid composition comprising a Mg halide selected from the group consisting of Mg dichloride and Mg dibromide, and a complex between the Mg dihalide and the electron-donor compounds in which composition the ratio Mg/moles of electron-donor is higher than 2, said solid composition being characterized in that in its X-rays spectrum the maximum intensity line appearing in the X-rays spectrum of the corresponding normal Mg dihalide, as defined in ASTM 3-0854 and 15-836 for the Mg dichloride and Mg dibromide respectively, is decreased in relative intensity and asymmetrically broadened to form a halo that shows an intensity peak shifted with respect to interplanar distance d of the maximum intensity line, or the spectrum is characterized in that the maximum intensity line is absent and in its place there appears a halo having an intensity peak shifted with respect to distance d of the maximum intensity line.

15. Catalysts according to claim 14, in which the Mg/moles of electron-donor molar ratio is between 2 and 15.

16. Catalysts according to claim 15, in which the electron-donor is selected from the group consisting of organic ethers and esters of organic carboxylic acids.

17. Catalysts according to claim 15, in which the electron-donor is an ether or ester of an aromatic carboxylic acid.

18. Catalysts according to claim 15, in which the electron-donor is an aliphatic ether.

19. Catalysts according to claim 14, in which component (c) is prepared by reacting the liquid halogenated tetravalent Ti compound with Mg dichloride and the intensity peak appearing in the X-rays spectrum of the component is comprised in the range from d 244 Å to d 2.97 Å.

20. Catalysts according to claim 14, in which the Ti compound is reacted with a product obtained by grinding mixtures of Mg dichloride or Mg dibromide with the electron-donor compound.

21. Catalysts according to claim 20, in which the electron-donor compound coground with the Mg dichloride or Mg dibromide is an aliphatic or aromatic ether.

22. Catalysts according to claim 1, in which the mixture which is ground includes at least one grinding promoter selected from the group consisting of silicone oils and inert solid substances.

23. Catalysts according to claim 14, in which the reaction with the liquid Ti compound is conducted at a temperature ranging from 20° C. to 200° C., and the solid reaction product is separated from the liquid phase under conditions such that less than 50% of Ti compounds extractable with $TiCl_4$ at 80° C. remains on the solid product.

24. The catalysts of claim 1, in which the valence of tetravalent Ti contained in component (c) is reduced to a value lower than 4 by treatment with reducing agents before component (c) is contacted with component (a).

25. A solid component for catalysts for polymerizing alpha-olefins, comprising at least on the surface, the reaction product of a Mg dihalide with a halogenated tetravalent Ti compound selected from the group consisting of Ti tetrahalides and Ti halogen alcoholates and with a hydrocarbyl electron-donor capable of forming complexes with Mg dihalides, the molar ratio electron-donor/Ti in said product being higher than 0.2 and the molar ratio halogen atoms/Ti being comprised between 10 and 90, said component being further characterized in that at least 80% by weight of the tetravalent Ti compounds contained therein is insoluble in boiling n-heptane and in that at least 50% by weight of the Ti compounds insoluble in n-heptane is insoluble in $TiCl_4$ at 80° C., and also in that the surface area of the product insoluble in $TiCl_4$ at 80° C., and the surface area of said component as such, is higher than 40 $m^2/g$.

26. A solid component for catalysts for polymerizing alpha-olefins according to claim 25, which component has been treated with a reducing agent in order to reduce the valence of Ti contained therein to a value lower than 4.

27. A solid component for catalysts for polymerizing alpha-olefins according to claim 25 in which the Mg dihalide is obtained by reaction of a Ti tetrahalide with an oxygen-containing Mg compound.

28. A solid component for catalysts for polymerizing alpha-olefins according to claim 27 in which the oxygen-containing Mg compound is selected from the group consisting of MgO, $Mg(OH)_2$, Mg(OH)Cl, Mg carbonate, Mg salts of organic acids, Mg silicate, Mg aluminates, Mg alcoholates and halogenated derivatives thereof.

29. A solid component for catalysts for polymerizing alpha-olefins according to claim 25, in which the Mg dihalide is obtained by reaction of Ti tetrahalide with a hydrated Mg dihalide containing from 0.1 to 6 moles of $H_2O$ per mole of dihalide.

* * * * *

UNITED STATES PATENT AND TRADEMARK OFFICE
CERTIFICATE OF CORRECTION

PATENT NO. : 4,226,741
DATED : October 7, 1980
INVENTOR(S) : Luciani LUCIANI et al It is certified that error appears in the above—identified patent and that said Letters Patent is hereby corrected as shown below:

Col. 17 - line 14 — "teatrvalent" should read - - - tetravalent - - -.

Signed and Sealed this

Seventeenth Day of March 1981

[SEAL]

Attest:

RENE D. TEGTMEYER

Attesting Officer — Acting Commissioner of Patents and Trademarks